United States Patent
Yancey, Jr. et al.

(10) Patent No.: US 6,408,248 B1
(45) Date of Patent: Jun. 18, 2002

(54) APPARATUS AND METHOD FOR PROVIDING ACCURATE BOUNDARIES OF PREDICTED AREAS OF DANGER FOR COLLISION AVOIDANCE

(75) Inventors: John F. Yancey, Jr., Troy, VA (US); Thomas E. Wood, Portsmouth, RI (US)

(73) Assignee: Northrop Grumman Corporation, Los Angles, CA (US)

( * ) Notice: Subject to any disclaimer, the term of this patent is extended or adjusted under 35 U.S.C. 154(b) by 0 days.

(21) Appl. No.: 09/613,641

(22) Filed: Jul. 11, 2000

(51) Int. Cl.$^7$ ............................. G08G 1/16; G01S 7/06
(52) U.S. Cl. ..................... 701/301; 701/300; 342/104; 340/435
(58) Field of Search ............................... 701/301, 300, 701/302; 342/104, 126, 107, 41, 455, 452, 453, 458; 340/903, 435, 556, 961, 436

(56) References Cited

U.S. PATENT DOCUMENTS

| | | | |
|---|---|---|---|
| 3,188,631 A | * 6/1965 | Birtley | 343/9 |
| 3,267,470 A | 8/1966 | Riggs | 342/183 |
| 3,278,934 A | 10/1966 | Riggs | 342/142 |
| 3,670,330 A | 6/1972 | Riggs | 342/182 |
| 3,717,873 A | 2/1973 | Riggs | 342/41 |
| 3,725,918 A | * 4/1973 | Fleischer et al. | 343/5 |
| 3,737,902 A | 6/1973 | O'Hagan et al. | 342/41 |
| 3,850,103 A | * 11/1974 | Krupen | 102/70.2 |
| 4,224,621 A | 9/1980 | Cornett et al. | 342/183 |
| 4,313,115 A | * 1/1982 | O' Sullivan | 343/5 EM |
| 4,623,966 A | * 11/1986 | O'Sullivan | 364/461 |
| 5,249,157 A | * 9/1993 | Taylor | 340/903 |
| 5,504,569 A | * 4/1996 | Kato et al. | 356/3.11 |
| 6,219,592 B1 | * 4/2001 | Muller et al. | 701/9 |

* cited by examiner

Primary Examiner—Tan Nguyen
Assistant Examiner—Dalena Tran
(74) Attorney, Agent, or Firm—Seymour Levine; Gerald L. Lett

(57) ABSTRACT

A true predicted area of danger providing a preselected miss distance between an intruding vehicle and own ship is provided. A miss distance circle, having a radius equal to the desired miss distance, is generated about the initial position of the intruding vehicle and the relative coordinates and distances from own vehicle of selected points on this miss distance circle are determined. Points of own vehicle intercept of these selected points are established and a smooth curve is drawn through these points to provide the boundary of the predicted area of danger.

20 Claims, 13 Drawing Sheets

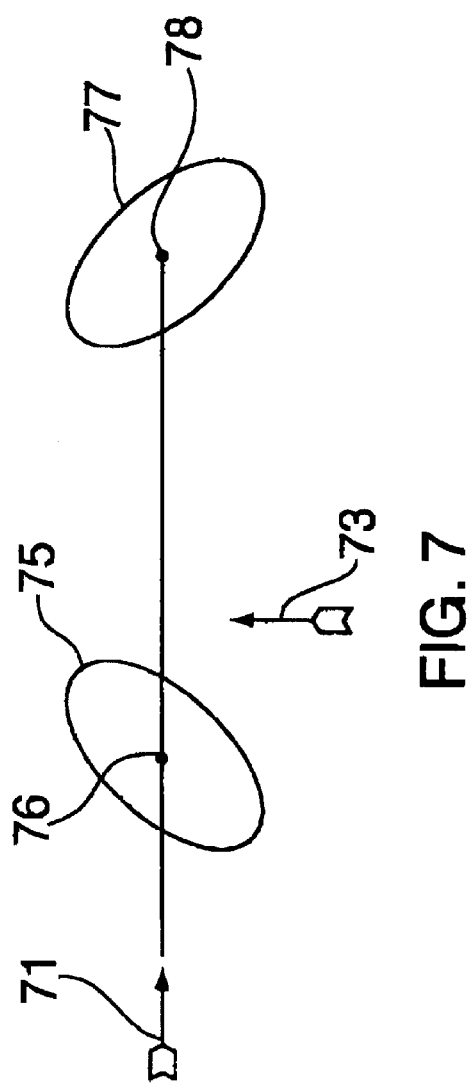
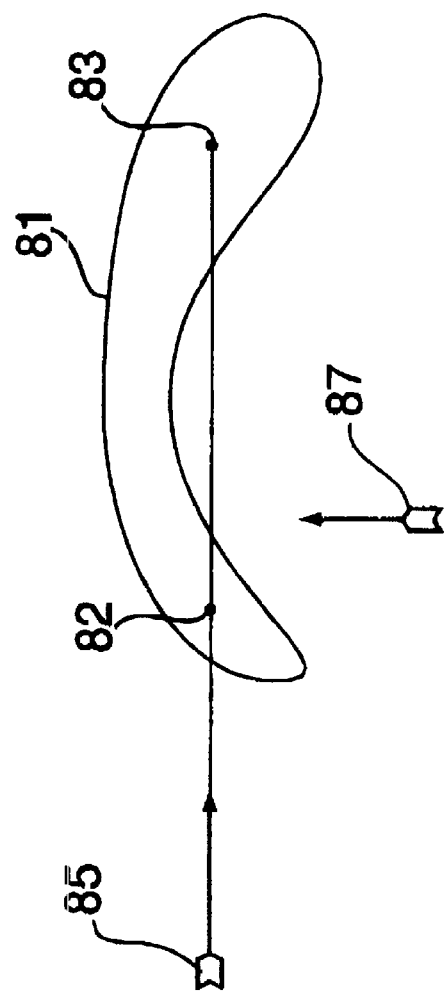

APPARATUS AND METHOD FOR PROVIDING ACCURATE BOUNDARIES OF PREDICTED AREAS OF DANGER FOR COLLISION AVOIDANCE

BACKGROUND OF THE INVENTION

1. Field of the Invention

The invention pertains generally to the field of collisions avoidance and more particularly to the indication of an area of danger, the perimeter of which is an exact representation of a desired miss distance between vehicles.

2. Basic components of a system for avoiding collisions between a vehicle, such as a ship, and other vehicles in its vicinity (collision avoidance system—CAS) are an apparatus for detecting ships (targets) in the vicinity of the ship, namely a radar, and a system that displays relevant target information. Target information is displayed so that a human operator can realize collision potential and determine a collision avoidance course of action.

CAS systems of the prior art have incorporated synthetically generated symbology on the radar display that provides collision avoidance information with respect to areas of possible collisions (predicted areas of danger—PADS) between own ship and radar detected targets. Range of a target from own ship and its relative bearing, determined by the radar, provide coordinates (R,θ) of a polar coordinate system with own ship at the center. These coordinates are transformed on to a Carterian x-y grid on which the target is positioned at $P_0$, the transformation providing the coordinates at (R sin θ, R cos θ). Own ship's heading may be added to θ to obtain the true bearing of the target, which may be substituted for the relative bearing to realize the familiar North-East plane of the local North-East-Down (NED) system. By tracking changes in R and θ of the target relative to own ship, estimates of range rate of change $\dot{R}$ and bearing rate of change $\dot{\theta}$ may be projected at points along own ships track. The relative velocity between a target and own ship may then be estimated by the vector $V_{rel} = <\dot{R}, \dot{\theta}>$. While R, θ, and $\dot{\theta}$ may vary with time, CAS assumes that the target velocity remains constant until own ship maneuvers.

A prior art CAS is described in U.S. Pat. No. 3,717,873 issued Feb. 20, 1973 to Riggs entitled "Ship's Maneuver Assessment System". Riggs determines a predicted point of collision (PPC). Own ship's speed $v_s$. In space and time, is represented by a cone given by:

$$x^2 + y^2 = (v_s t)^2$$

where t is the vertical axis of the cone and x and y are $v_x t$ and $v_y t$, respectively. The target's initial position $P_0$ and velocity $V_T$ determine a straight line in space given by the vector equation $$\bar{P}(t) = P_0 + \bar{V}_T t$$

A PPC is any point of intersection of this line with the cone. Depending upon the courses and speeds, there may be zero, one, or two PPCs for a given target. As long as own ship's course does not take it through any of the target's PPCs, a collision is not possible.

It is desirable to miss a target by a predetermined minimum distance. Riggs displays this minimum distance with a circle, having a radius equal to the minimum distance, centered about the PPC. This representation is true only if the target ship is stationary. When the target and own ship are moving, the boundary of the protected area also moves, distorting the boundary, which is actually kidney shaped.

A CAS that addresses the shortcoming of the circle centered about a PPC is described in U.S. Pat. No. 3,725,918 issued Apr. 3, 1973 to Fleischer, et al entitled "A Collision Avoidance Display Apparatus For Maneuverable Craft". The patent describes the determination of a predicted area of danger (PAD), the boundary of which is approximated on a display by an ellipse surrounding the PPC. One axis of the ellipse runs along the target's predicted track, thereby establishing the other axis perpendicular to the track. The width of the ellipse along the perpendicular axis, minor axis of the ellipse, is twice the predetermined miss distance $R_M$. End points of the ellipse on the axis along the target ship's track, major axis of the ellipse, are determined by relating the miss distance to the relative velocity between own ship and a target, determining the direction own ship must take to realize the miss distance, establishing the cross-over of own ship traveling in this direction with the target's track, and determining the distance between the target and the cross-over point. Fore and aft crossover points are determined, the distance between these points being the major axis of the ellipse.

Synthetic symbology, such as ellipses, are drawn on a radar display during the flyback or deadtime of the azimuth sweeps. This requires separate circuitry and display deflection elements, such as deflection coils or plates in the cathode ray tube, for the display of the ellipses. These disadvantages were overcome by the invention disclosed in U.S. Pat. No. 4,224,621, issued to J. A. Cornett, et al on Sep. 23, 1980. As described in this patent, the analog radar returns are digitized and a full frame of data is stored and displayed in accordance with the scanning rate of radar antenna. The synthetic symbology is displayed with the radar data utilizing the same deflection circuitry used for displaying the radar data. Instead of utilizing ellipses to designate the PADs, however, the synthetic symbology comprises straight line segments which form a hexagon. Generating the synthetic symbology in this manner provides a saving in software since the display of an ellipse requires more software than does the display of a hexagon.

As implemented in the prior art, the PAD boundaries are only approximations of the true boundaries. In these implications, the dimensions and positions of the PADs change as the target ship and own ship traverse their routes. Due to the approximations of the PAD boundaries made in the prior art, as own ship approaches the path of a target that is slower than own ship, the major axis of the PAD decreases and becomes undefined as own ship crosses the target's path. As own ship steams away from the path, the PAD again is defined and the major axis begins to expand. A classic case is that of a target that is faster than own ship. Such a target has two PADs. As own ship approaches the targets predicted path in the region between these PADs the distance between the PADs decreases. When the predicted path of the target is crossed the PADs overlap, indicating a collision danger even though none exists.

SUMMARY OF THE INVENTION

The above delineated disadvantages of the prior art are overcome by the present invention by establishing the boundary of a true PAD. When own ship intercepts a point on this boundary it will at the desired miss distance from the position of the target at the time of the boundary intercept.

A miss distance circle having a radius equal to the desired miss distance is generated about the initial position of the target and the coordinates of selected points on this miss distance circle and the distances of these selected points from own ship are respectively determined. Each of these selected points has a heading and velocity equal to that of the target. Points of intercept by own ship for these selected points are established utilizing the determined coordinates, the initial distance from own ship of each selected point, the target heading and speed, and the speed of own ship. A smooth curve is then drawn through the points of intercept to establish the boundary of the predicted area of danger (PAD).

BRIEF DESCRIPTION OF THE DRAWINGS

FIG. 7 is an illustration of two PADs generated when the speed of the target is greater than the speed of own ship.

FIG. 8 is an illustration of the merger of two PADs when the speed of the target is greater than the speed of own ship.

DESCRIPTION OF THE PREFERRED EMBODIMENTS

Actual boundaries for PADs are provided by the present invention. Positions of selected points on the circular boundary of the PAD about the initial position of the target are tracked with the movement of the target and own ship to determine points of intercept by own ship with the selected points. These points of intercept, each of which is at the desired miss distance from the position of the target at the time of intercept, are connected to provide the true PAD boundary.

Figure 1:
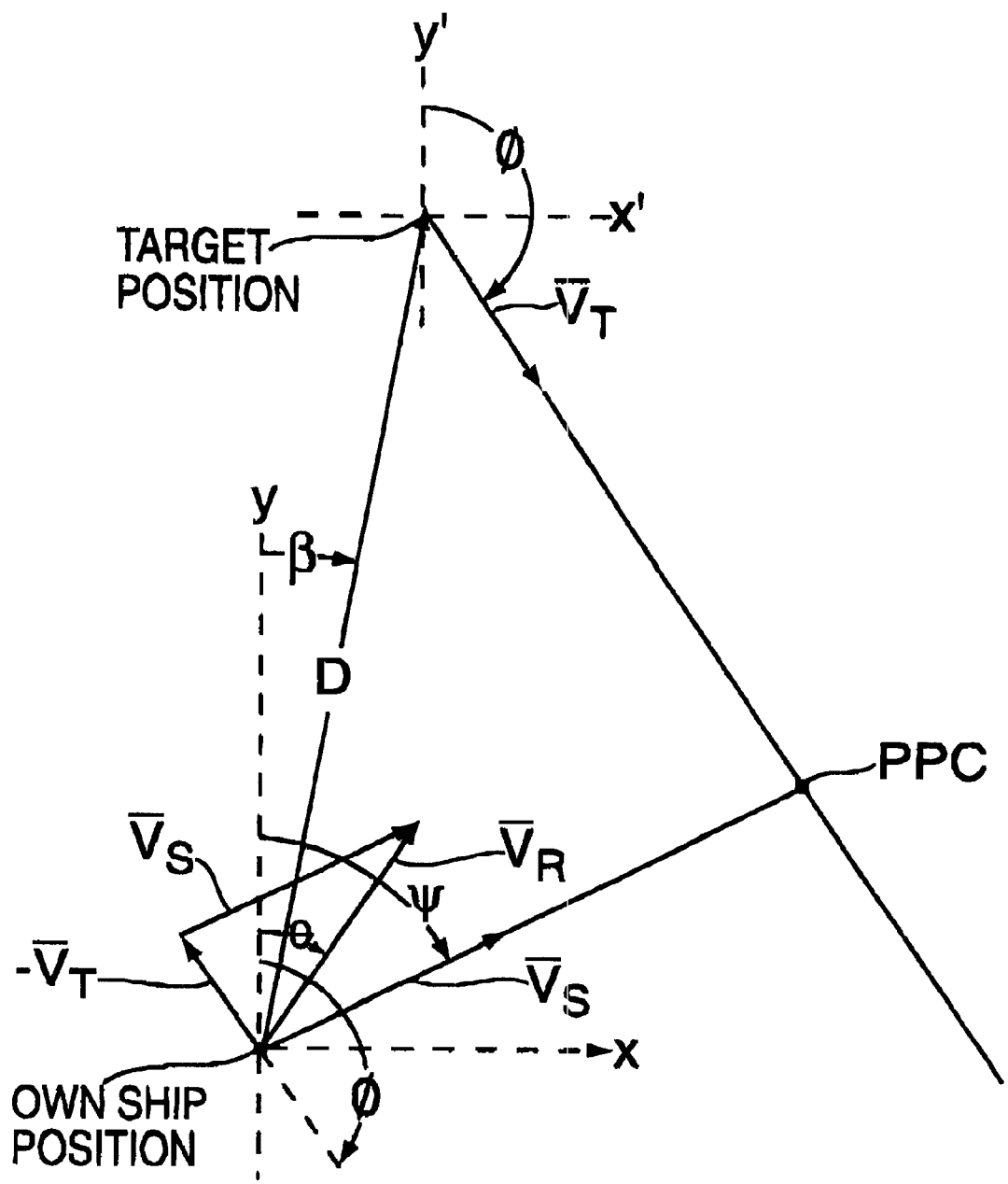
FIG. 1 is a vector diagram of own ship and target velocities useful for explaining the determination of the relative velocity and the predicted point of collision.

Relative velocity between the target and own ship may be determined as shown in FIG. 1. Relative velocity $\overline{V}_R$ is the vector difference between velocity of own ship $\overline{V}_S$ and the target ship $\overline{V}_T$. That is, $\overline{V}_R = \overline{V}_S - \overline{V}_T$ from which it is evident that $\overline{V}_S = \overline{V}_R + \overline{V}_T$. In an x-y coordinate system, as shown in FIG. 1, this vector subtraction establishes:

$$V_S \cos \psi = V_R \cos \theta + V_T \cos \phi$$

$$V_S \sin \psi = V_R \sin \theta + V_T \sin \phi$$

where $\theta$, $\phi$, and $\psi$ are the headings, referenced to the y-axis, of the relative velocity, target velocity, and own ship velocity, respectively. Squaring these equations and adding provides:

$$V_R = V_T \cos(\theta - \phi) \pm \sqrt{V_S^2 - V_T^2 \sin^2(\theta - \phi)}$$

$$\tan \psi = \frac{V_R \sin \theta + V_T \sin \phi}{V_R \cos \theta + V_T \cos \phi}$$

Letting $\alpha = \theta - \beta + \pi$, $V_R$ can be written as $$V_R = V_T \cos \alpha \pm \sqrt{V_S^2 - V_T^2 \sin^2 \alpha}$$

The distance from own ship to the intercept point P may be established by multiplying $V_S$ by the time (t) to intercept. This time may be determined from the set of equations:

$$V_{Sx}^2 + V_{Sy}^2 = V_S^2$$

$$V_{Sx}t = V_{Tx}t + x_{T0}$$

$$V_{Sy}t = V_{Ty}t + y_{T0}$$

in which $x_{T0}$ and $y_{T0}$ are the components of the initial target position, $V_{Sx} = V_S \cos \psi$ and $V_{Sy} = V_S \sin \psi$, $V_{Tx} = V_T \cos \phi$, and $V_{Ty} = V_T \sin \phi$ are the components of own ship velocity $V_S$ and the target ship velocity $V_T$. Combining this set of equations yields;

$$(V_S^2 - V_T^2)t^2 - 2(V_{Tx}x_{T0} + V_{Ty}y_{T0})t - D^2 = 0$$

so that the time to intercept is:

$$t_i = \frac{(V_{Tx}x_{T0} + V_{Ty}y_{T0}) \pm \sqrt{(V_{Tx}x_{T0} + V_{Ty}y_{T0})^2 + (V_S^2 - V_T^2)D^2}}{V_S^2 - V_T^2} \quad (1)$$

where D is the initial distance of the target from own ship.

The target coordinates as a function of time are: $x_T = x_{T0} + V_{Tx}t$, $y_T = y_{T0} + V_{Ty}t$. Substituting $t_i$ for t in these equations provides the coordinates of the PPC. The collision course $\psi$ of own ship may then be determined from $$\tan \psi = \frac{x_{T0} + V_{Tx}t_i}{y_{T0} + V_{Ty}t_i}$$

A collision is possible only if $V_R$ is real and positive. If $V_R$ is zero the separation between the ships will be maintained, while a negative $V_R$ indicates that the distance between the ships is increasing. Three situations must be considered for the evaluation of $V_R$: $V_S > V_T$, $V_S = V_T$, and $V_S < V_T$.

Case I $V_S > V_T$

When $V_S > V_T$, $V_S^2 - V_T^2 > 0$ and the value of the square root in the equation for $V_R$ is greater than $V_T \cos \alpha$. Additionally, the value of the square root in the equation for the time to intercept is greater than $V_{Tx}x_{T0} + V_{Ty}y_{T0}$. Consequently, the positive sign must be chosen for the square root in both equations and there is only one solution for $V_R$ and t. It should be apparent that the intercept point P may also be represented as $(V_{Sx}t, V_{Sy}t)$, where $V_{Sx} = V_S \sin \psi$, $V_{Sy} = V_S \cos \psi$.

Case II $V_S = V_T$

When $V_S = V_T$ the time to intercept equation reduces to the linear equation $$2(V_{Tx}x_{T0} + V_{Ty}y_{T0})t + D^2 = 0$$

Substituting $V_{Tx}=V_T \sin \phi$, $V_{Ty}=V_T \cos \phi$, $x_{T0}=D \sin \beta$, $y_{T0}=D \cos \beta$, where $\beta$ is the bearing angle of the target relative to own ship, as shown in FIG. 1, and solving for t yields:

$$t = -\frac{D}{2V_T \cos(\phi - \beta)}$$

Since t must be greater than 0, a solution exists only for target courses and positions for which $\cos(\phi-\beta)$ is negative. Similarly, when $V_S=V_T$, $V_R=2V_T \cos \alpha$ and solutions for $V_R$ exist only when $\cos \alpha$ is positive Case III $V_S<V_T$ When this condition exists there may be one or two solutions for $V_R$ depending upon the values of $V_S$, $V_T$ and $\alpha$:
- if $V_S^2-V_T^2 \sin^2\alpha=0$ and $\cos \alpha$ is positive there is but one solution, $V_R=V_T \cos \alpha$
- if $V_S^2-V_T^2 \sin^2\alpha>0$ and $\cos \alpha$ is positive there are two solutions, one for the positive sign of the square root and one for the negative sign
- if $V_S^2-V_T^2 \sin^2\alpha<0$ there is no real solution
- if $\cos \alpha$ is negative the target and the selected course of own ship are on diverging paths.

Rewriting the equation for the time to intercept in terms of the bearing angles $\phi$ and $\beta$ yields:

$$t_i = D \frac{-V_T \cos(\phi - \beta) \pm \sqrt{V_S^2 - V_T^2 \sin^2(\phi - \beta)}}{V_T^2 - V_S^2} \quad (2)$$

A positive real time to intercept requires $\cos(\phi-\beta)<0$ and $V_S/V_T>|\sin(\phi-\beta)|$. When these conditions exists there are two solutions for the time to intercept.

Figure 2A:
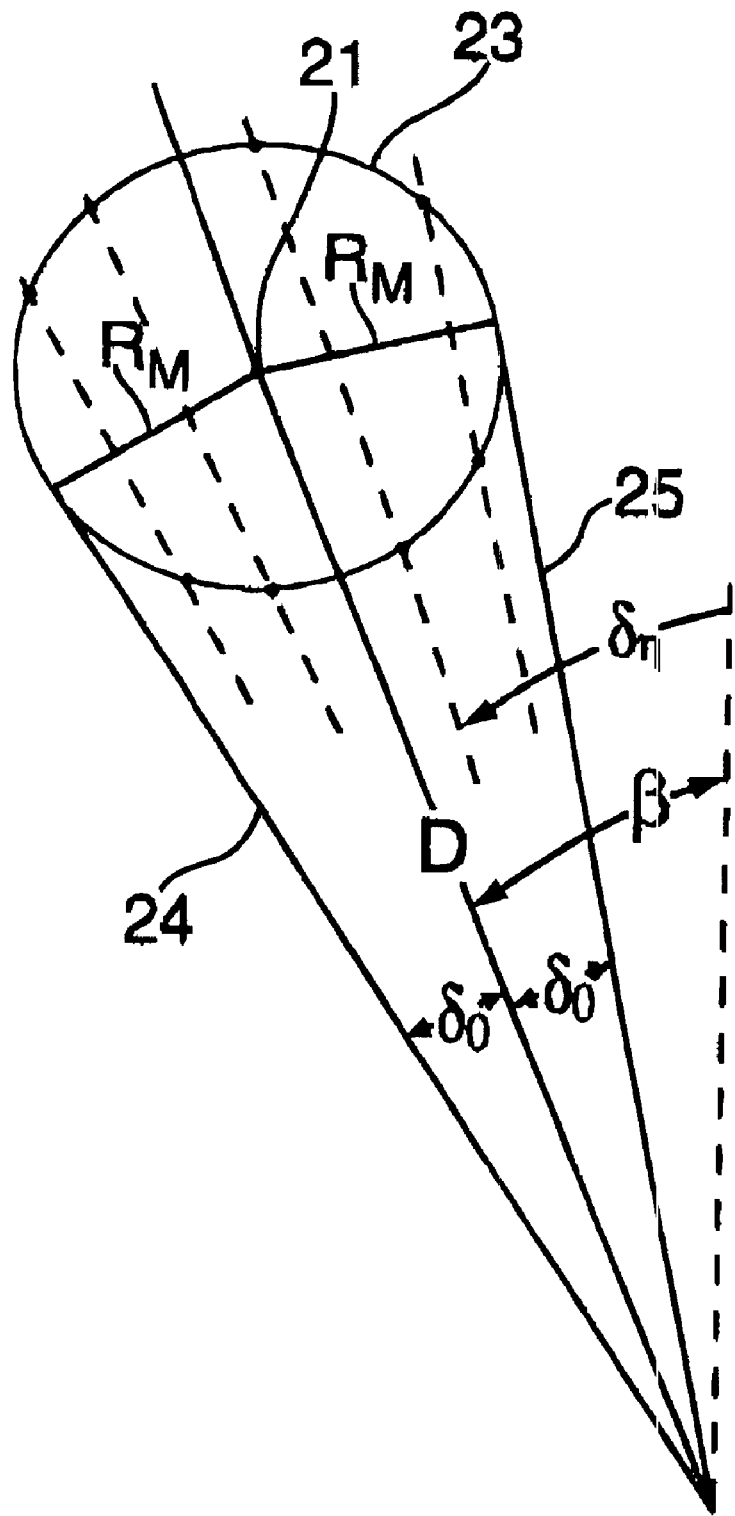
FIGS. 2A–2C are illustrations of methods for selecting points on the miss distance circle.
Figure 2B:
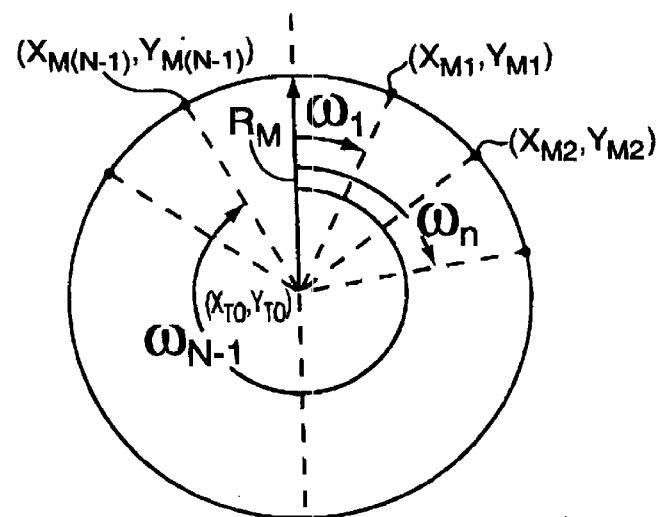

Refer now to FIG. 2A. As stated previously, a PAD is a region about a target which is within a predetermined miss distance from the target. When the target is stationary the perimeter of this area is a circle 23 having a radius $R_M$ that is equal to the desired miss distance, as shown in FIG. 2A. This miss distance circle (MDC) is distorted when the target is in motion and, in general, is shaped like a kidney bean. Points on the MDC move with a velocity equal to the velocity of the target and the intercept with own ship and time to intercept, for each point, may be determined in the a manner previously described. Lines 24, 25 drawn from own ship tangent to the circle determine the initial angular course range $2\delta_0$ to be avoided to insure a miss distance between own ship and the stationary target that is at least equal to $R_M$. The number of points on the circle for which intercepts with own ship are to be determined may be established by dividing $2\delta_0$ into N equal angles and extending the angle edges between the two tangents to intersect the circle at two points. The relative bearing $\delta_n$ of each edge is given by $\beta-\delta_0(1-2 n/N)$, where n runs from 0 to N. Alternatively, a number of points equiangularly spaced about the circle, as shown in FIG. 2B, may be chosen and the intercepts with own ship for each determined. A smooth curve drawn through the intercepts of own ship with the MDC points define the PAD.

In determining the time for own ship to intercept a point on the MDC, the initial distance from own ship to that point and the initial x-y coordinates of that point replace the distance D to the target and the target coordinates $x_{T0}$ and $y_{T0}$ in the time to intercept equation (1) and the distance to that point and its relative bearing 6n replace the target distance D and its relative bearing g in the time to intercept equation (2).

Figure 3:
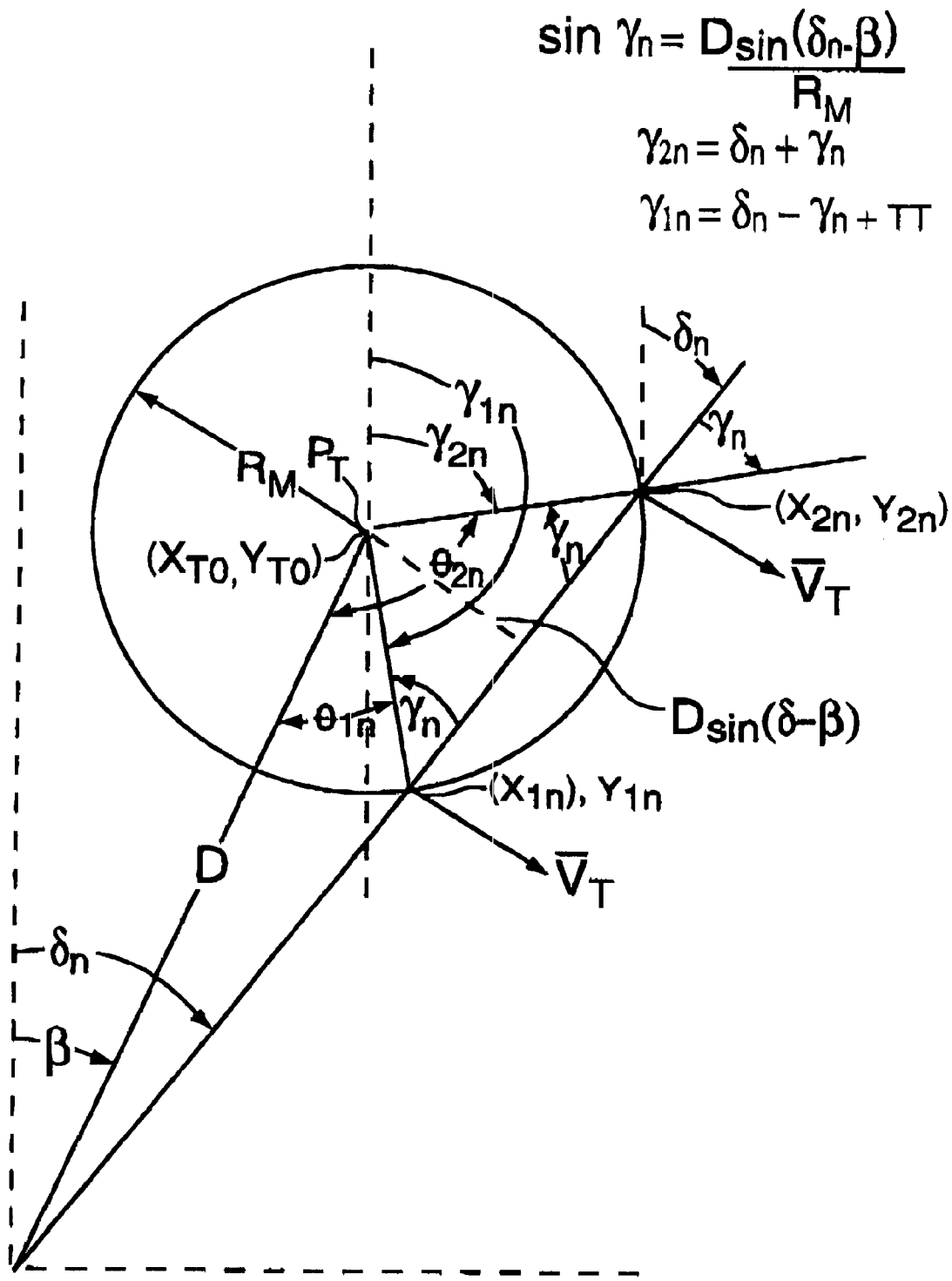
FIG. 3 is a diagram useful for explaining a method for determining the initial coordinates and distance from own ship of selected points on the miss distance circle.

Refer now to FIG. 3 where the bearing angles for two intercepts, $x_{1n},y_{1n}$ and $x_{2n},y_{2n}$, on the circle of radius $R_M$ for a selected bearing angle $\delta_n$ are shown. The coordinates of these intersections are respectively, $(x_{T0}+R_M \sin \gamma_{2n}, y_{T0}+R_M \cos \gamma_{2n})$ and $(x_{T0}+R_M \sin \gamma_{1n}, y_{T0}+R_M \cos \gamma_{1n})$. As shown in FIG. 3, angles $\gamma_{2n}$ and $\gamma_{1n}$ are respectively $\delta_n+\gamma_n$ and $\delta_n-\gamma_n+\pi$, where $$\gamma_n = \sin^{-1} \frac{D \sin(\delta_n - \beta)}{R_M}.$$

The distance from own ship to each point may be found with the utilization of the Law of Cosines to be:

$$D_{R_n} = \sqrt{D^2 + R_M^2 - 2DR_M \cos\theta_n}$$

where $\theta_{n1}=\gamma_n-\delta_n+\beta$ and $\theta_{n2}=\pi-(\gamma_n+\gamma_n)+\beta$.

Though the points on the MDC for PAD mapping may be chosen by dividing the angular range between the two MDC tangents into equal angular segments, a preferred method is to divide the circumference of the MDC into equal arc segments and choose the points on the MDC between the arc segments, as shown in FIG. 2B. The arc segments may be referenced to the N-S axis and the points positioned clockwise at angular positions $\omega_n=2\pi n/N$, N is the desired number of points and n has values from 1 to N. Coordinates of the points so positioned are at $x_{Mn}=x_{T0}+R_M \sin \omega_n$, $y_{Mn}=y_{T0}+R_M \cos \omega_n$.

Figure 2C:
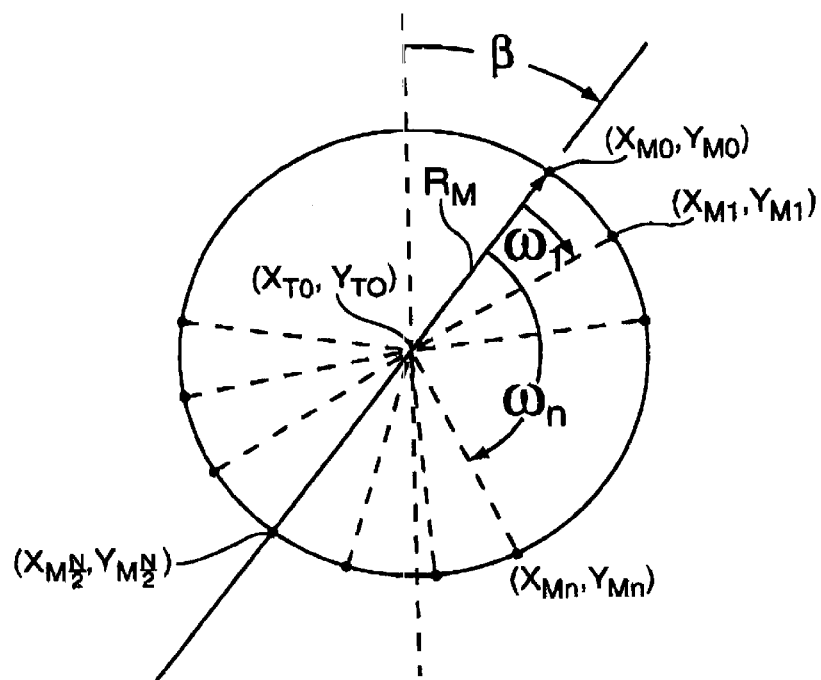

Equally spaced points on the circumference of the MDC may also be referenced to the relative bearing of the target, as shown in FIG. 2C. The coordinates of these points are then determined from the following equations: $x_{Mn}=x_{T0}+R_M \sin(\omega_{Mn}+\beta)$, $y_{Mn}=y_{T0}+R_M \cos(\omega_{Mn}+\beta)$ where $\omega_{Mn}=2\pi n/N$, N is the number of points to be selected and n takes values from 1 to N.

Figure 2D:
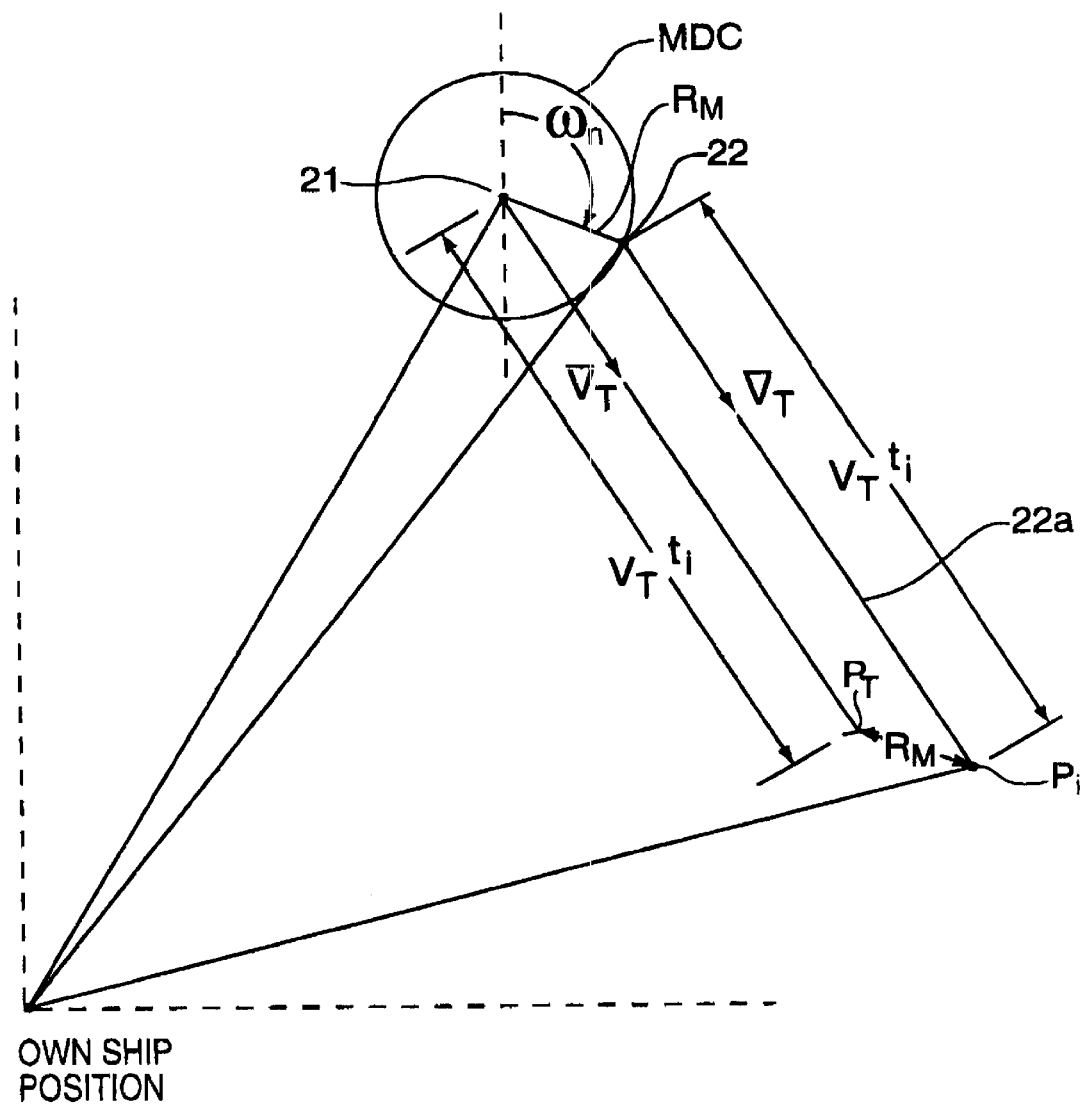
FIG. 2D is a vector diagram useful for explaining the determination of the point of intercept of own ship with a selected point on the miss distance circle.

All the points on the circumference of the miss distance circle have the same velocity vector $\overline{V}_T$ as the target. Thus, these points and the target have the same speed and traverse parallel paths. Therefore, the relative velocity of each point with own ship is equal to the relative velocity of the target with own ship. Consequently, the time for own ship to intercept the nth selected point on the miss distance circle $R_M$ may be determined from equation (1) utilizing $V_T$, $V_S$, and the coordinates of the selected nth selected point. The nth selected point intercept position $P_i$ may then be determined from $x_{ni}=x_n+V_{Tx}t_i$, $y_{ni}=y_n+V_{Ty}t_i$. Fitting a curve through the intercept points $P_i$ establishes the PAD boundary. Points on this boundary will always be at a distance $R_M$ from the target position at the time $t_i$. Referring to FIG. 2D, point 22 on the MDC traverses a path 22a that is parallel to the target path 21a and travels the same distance $V_T t_i$ as the target over the time interval $t_i$. Consequently, at the time $t_i$, $P_i$, the position of the point 22, is at a distance $R_M$ from $P_T$, the position of the target.

Figure 4:
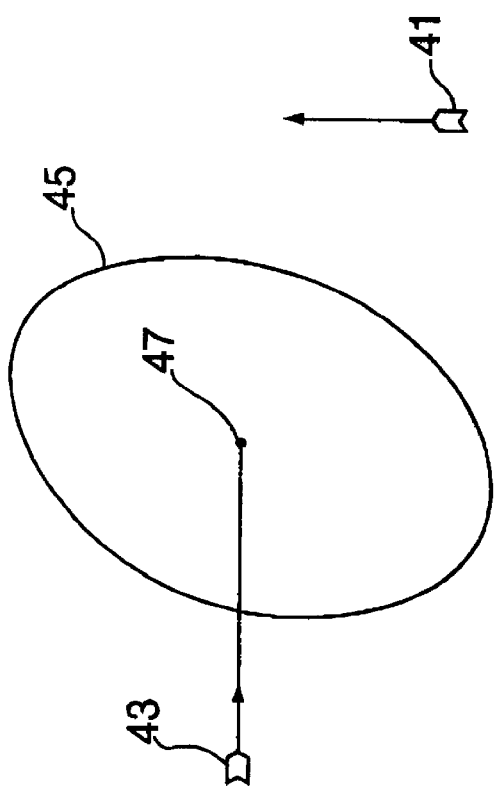
FIG. 4 is an illustration of a PAD (predicted area of danger) generated when the speed of own ship is greater than the speed of the target.

In each of the three cases discussed above, the points on the circumference of the miss distance circle are within the angular range between $\beta+\gamma_0$ and $\beta-\gamma_0$, as shown in FIG. 2A. When $V_S$ is greater than $V_T$ (Case I) there is but one PPC and the boundary of the PAD may be determined as previously discussed. Referring now to FIG. 4, consider own ship 41 having a velocity of 15 knots on a perpendicular course with a target at an initial distance of approximately 3 nmi, a bearing of approximately 285°, and a velocity of 10 knots, with a desired miss distance of 1 nmi. For these conditions a PAD 45, substantially elliptically shaped, about a PPC 47 is produced.

Figure 5A:
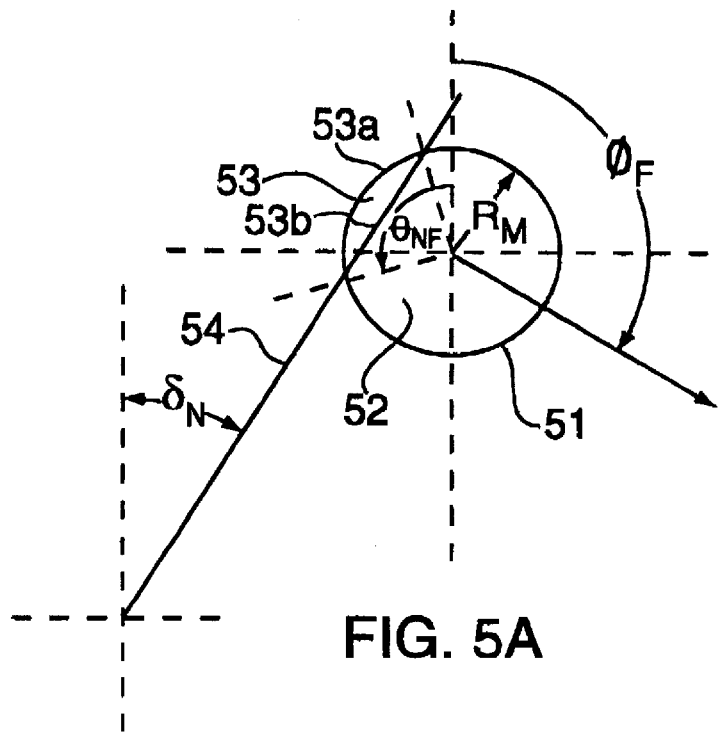
FIGS. 5A–5C are diagrams useful for explaining methods for selecting points on the miss distance circle within the feasibility region.
Figure 5B:
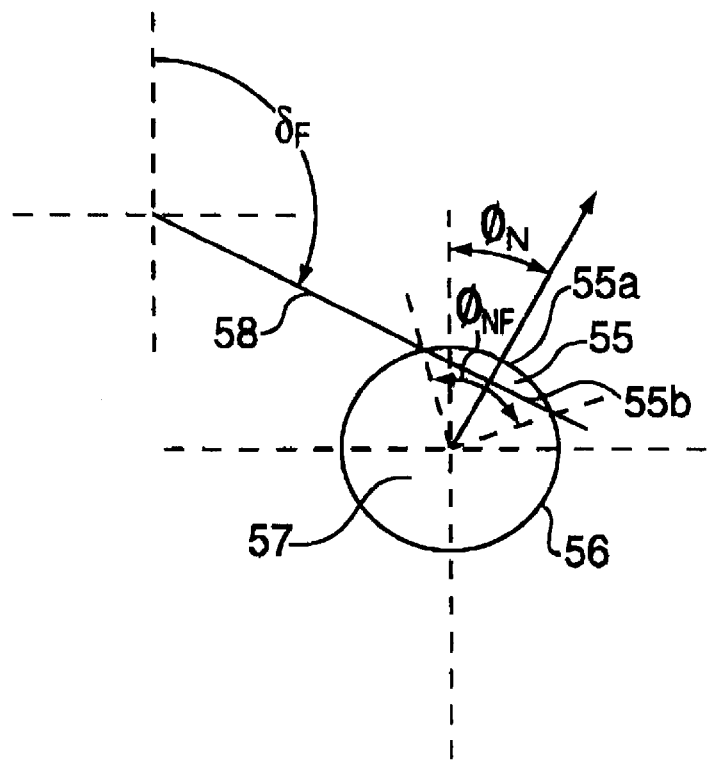

When $V_S$ is equal to $V_T$ (Case II) solutions exist only when $\cos(\phi-\delta)<0$. Thus, for a feasible solution $\delta$, the bearing angle of the selected point, must be in the range between $\phi-3\pi/2$ and $\phi-\pi/2$ (feasible sector), $\phi$ being the bearing angle of the target track. If the feasible sector contains only part of the region between $\beta+\delta_0$ and $\beta-\delta_0$, the points on the feasible sector boundary where $\cos(\phi-\delta)=0$ will have an intercept time that is infinite ($t=\infty$). These are the points for which the relative velocity (closing speed) is zero, own ship is on a substantially parallel course with the target. Points on the MDC circumference outside the feasible sector cannot be intercepted. Feasible and non-feasible sectors are illustrated in FIGS. 5A and 5B. As shown in FIG. 5A, a target with a heading angle $\phi_F$ for which a feasibility boundary at a bearing angle $\delta_N$ exists, will have a region 52 in the feasible sector and a region 53 determined by arc 53a of the central angle $\theta_{NF}$ and its cord 53b that is in the non-feasible sector. Points on the MDC 51 within the feasible sector are therefore on the arc segment $2\pi-\theta_{NF}$. All points on the feasibility boundary 54 have an infinite time to intercept and map at points at infinity. Since points at infinity can not be shown on a display, these points are approximated.

Figure 6:
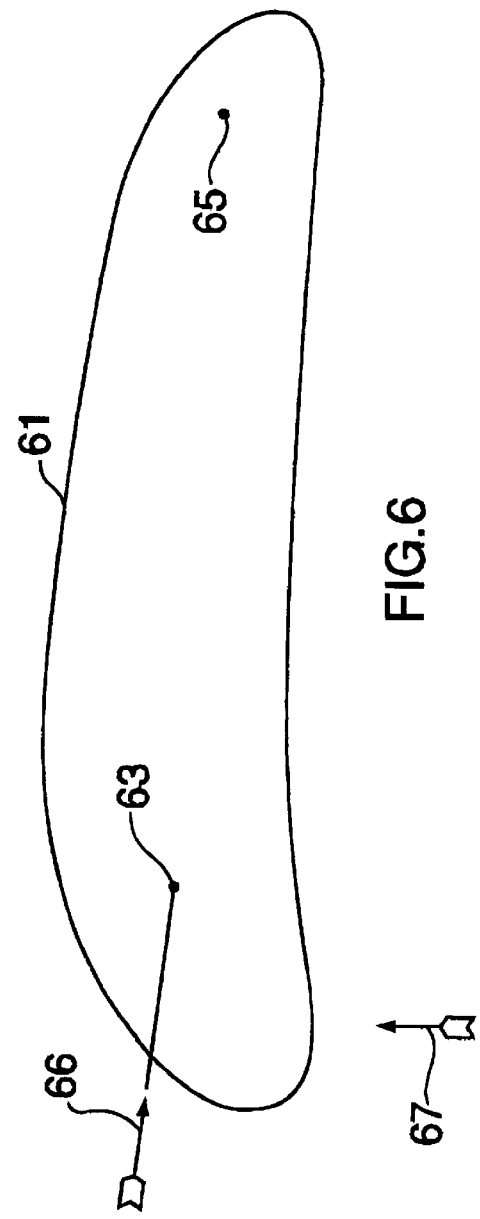
FIG. 6 is an illustration of a PAD generated when the speed of own ship and the target are equal.

FIG. 5B is an illustration of feasible and non-feasible sectors for a target having a heading angle $\phi_N$ and a feasibility boundary $\delta_F$ having angle values that differ from that of the heading and boundary values in FIG. 5A. In this situation, the feasible sector 57 and the non-feasible sector 55 which is bounded by the arc 55a of the central angle $\theta_{NF}$ of the MDC 56 and its cord 55b are located at different angular positions about the center of the MDC. As for the situation in FIG. 5A, all points on the feasibility boundary 58 have an infinite time to intercept and map at points at infinity. Since infinity cannot be mapped these points are approximated. Referring to FIG. 6, a PAD 61 is shown surrounding two PPCs 63 and 65 for a target 66 and own ship 67 each at a velocity of 10 knots, on perpendicular courses with an initial relative bearing, to the target, of approximately 285° and range of approximately 2 nmi. With a desired miss distance of 1 nmi the PAD is shaped as an elongated kidney, as shown in the figure.

Figure 5C:
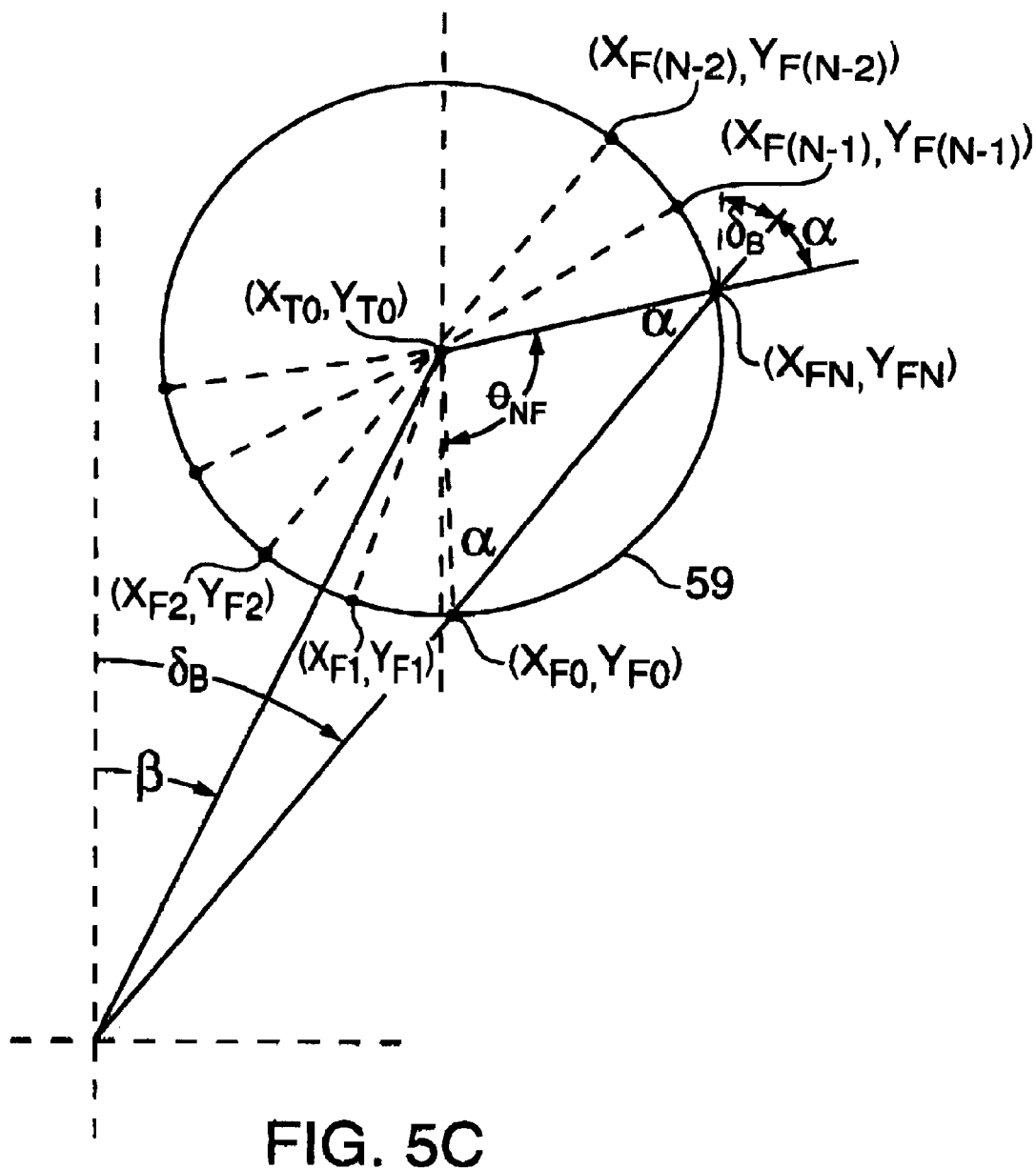

Refer now to FIG. 5C. Points on the MDC for PAD mapping are chosen only within the feasible sector which runs clockwise on the circumference 59 from the point ($x_{F0}$, $y_{F0}$), the first interaction of the boundary with the MDC, to the point ($x_{FN}$, $y_{FN}$), the second intersection of the boundary with the MDC. The arc between the first and second intenrstions may be divided into N equal arc segments, providing points on the circumference at angle $\omega_n$ about the center ($x_{T0}$, $y_{T0}$), the initial target ship location, where $\omega_n=(\pi+2\alpha)n/N+(\delta_B-\alpha)$. This division provides points on the circumference having coordinates $x_{Fn}=x_{T0}+R_M \sin \omega_n$, $y_{Fn}=y_{T0}+R_M \cos \omega_n$, n runs from 0, the first boundary point, to N, the second boundary point.

When $V_S$ is less than $V_T$ (Case III), each point on the circumference of the miss distance circle may have 0, 1, or 2 intercepts on the target track. An intercept is feasible for a point on or within the miss distance circle when the time to intercept, as determined from equation (2), is real and positive, that is when both $\cos(\phi-\delta)<0$ and $V_S^2-V_T^2 \sin^2(\phi-\delta) \geq 0$. To satisfy these conditions $\delta$ must be within a sector bounded by $\phi-3\pi/2$ and $\phi-\pi/2$ and within a sector in which $|V_S/V_T| \geq |\sin(\phi-\delta)|$. The restriction imposed by the second condition is at least as stringent as the first and therefore the second condition controls the determination of the feasible sector. If the entire circumference of the miss distance circle is in the feasible sector every point on the circumference will have 2 intercepts so that the circumference maps into two distinct PADs, as shown in FIG. 7. This figure is representative of a target 71 and own ship 73 traversing perpendicular courses with velocities of 20 knots and 10 knots, respectively, the target being initially at a range of approximately 5 nmi at a relative bearing of approximately 285°. With a desired miss distance of 1 nmi, PAD 75 surrounds PPC 76 and PAD 77 surrounds PPC 78. Each PAD is shaped as a kidney beam, but the shape of PAD 75 differs from that of PAD 78.

If the circumference is cut by one of the feasible sector boundaries, the points not in the feasible sector will have no intercepts, the points on the boundary will have one intercept, and points within the feasible sector will have two intercepts. In this situation the two PADs will merge to form a single PAD 81 surrounding PPCs 82 and 83, as shown in FIG. 8. This PAD is kidney shaped and is representative of a target 85 on a course that is perpendicular to that of own ship 87. The PAD shown is for a target having a velocity of 20 knots at an initial distance from own ship 87 of 5 nmi at an bearing of 290° with own ship velocity being 10 knots.

Figure 9:
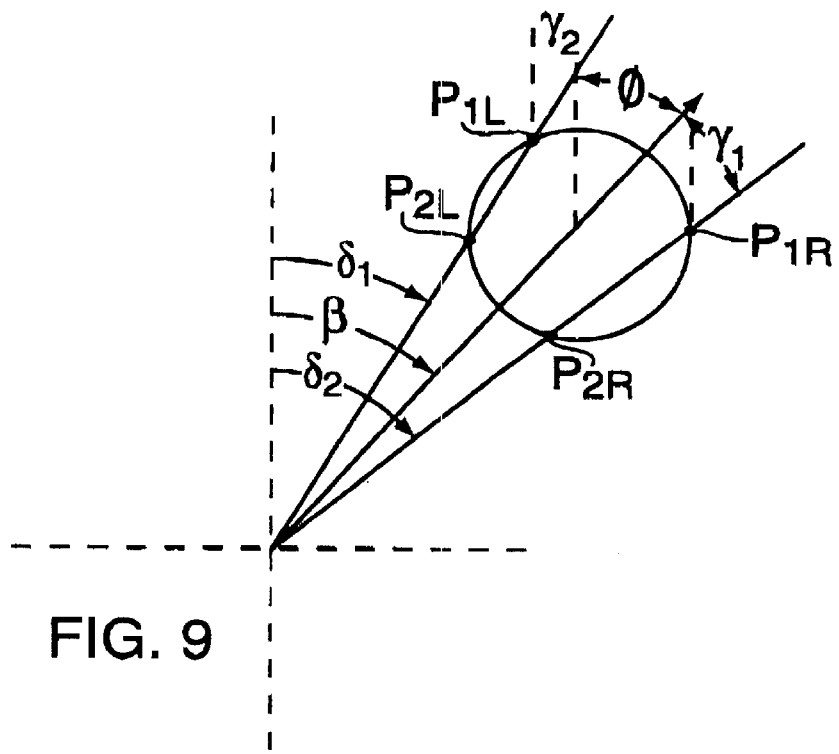
FIG. 9 is a geometric representation of a miss distance circle cut by two feasibility boundaries.
Figure 10:
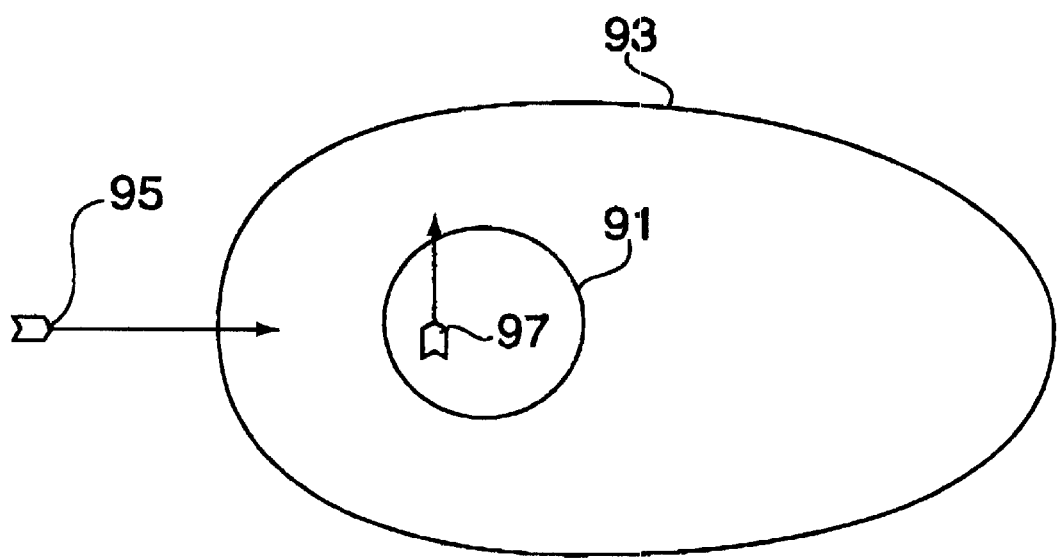
FIG. 10 is an illustration of a PAD generated when the miss distance circle is cut by two feasibility boundaries.

If the region within the miss distance circle is cut by both the feasible sector boundaries there are two lines of points with a single intercept. In this situation the feasible sector boundaries $\delta_1$ and $\delta_2$, as shown in FIG. 9, are lines of points, respectively, having a single intercept. Under these conditions two closed distinct regions will be formed which intersect in two places producing a "donut" shaped region having an inner boundary 91 and an outer boundary 93, as shown in FIG. 10. This "donut" shaped PAD may be formed when a target 95 at an initial range of 1.65 nmi and a bearing of 270° on a course perpendicular to that of own ship 97, which is traveling at 10 knots, and the desired miss distance is one nmi. The areas within the "donut hole" and outside the perimeter of the PAD 93 are the safe regions.

Five PAD rendering situations exist for the three cases discussed above:

1. Cases I and II—unique mapping for each selected point on the miss distance circle.
2. Case II—region within the miss distance circle cut by a feasibility sector boundary, points along the boundary map at infinity, and all points on the miss distance circle within the feasibility sector map to a unique point.
3. Case III—entire miss distance circle within the feasibility region, two PPCs exist and each point on the miss distance circle has two mapping points, establishing two distinct PADs one about each PPC.
4. Case III—region within the miss distance circle cut by a feasibility boundary, two PPCs exist, the two PADs merge and a single PAD about both PPCs is formed.
5. Case III—region within the miss distance circle is cut by two feasibility boundaries, two PPCs exist, the region in the feasibility sector between the two boundaries becomes donut shaped with the PPCs between in the inner and outer boundaries of the donut.

Figure 11:
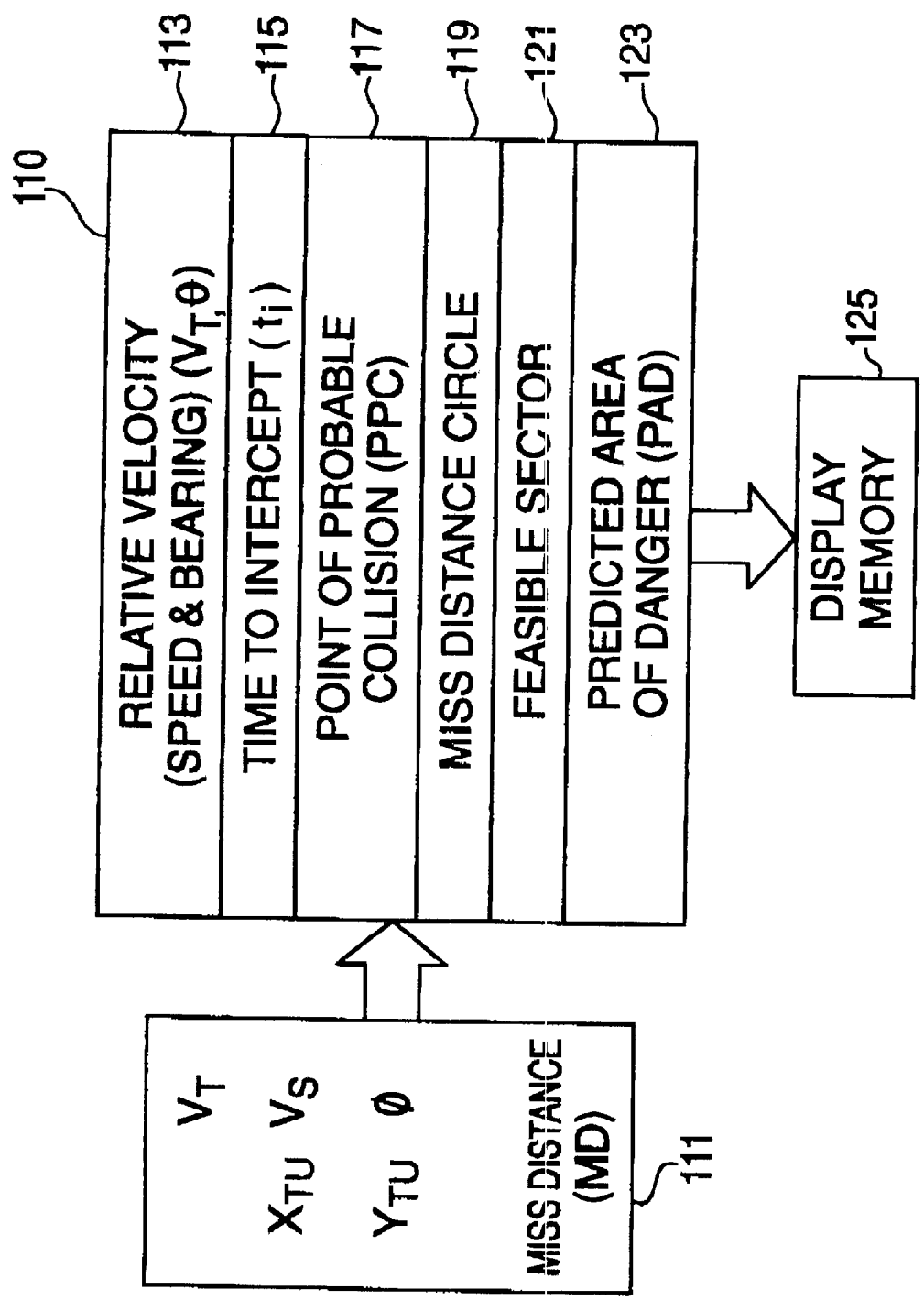
FIG. 11 is a diagram of a processor that may be utilized to practice the invention.
Figure 12:
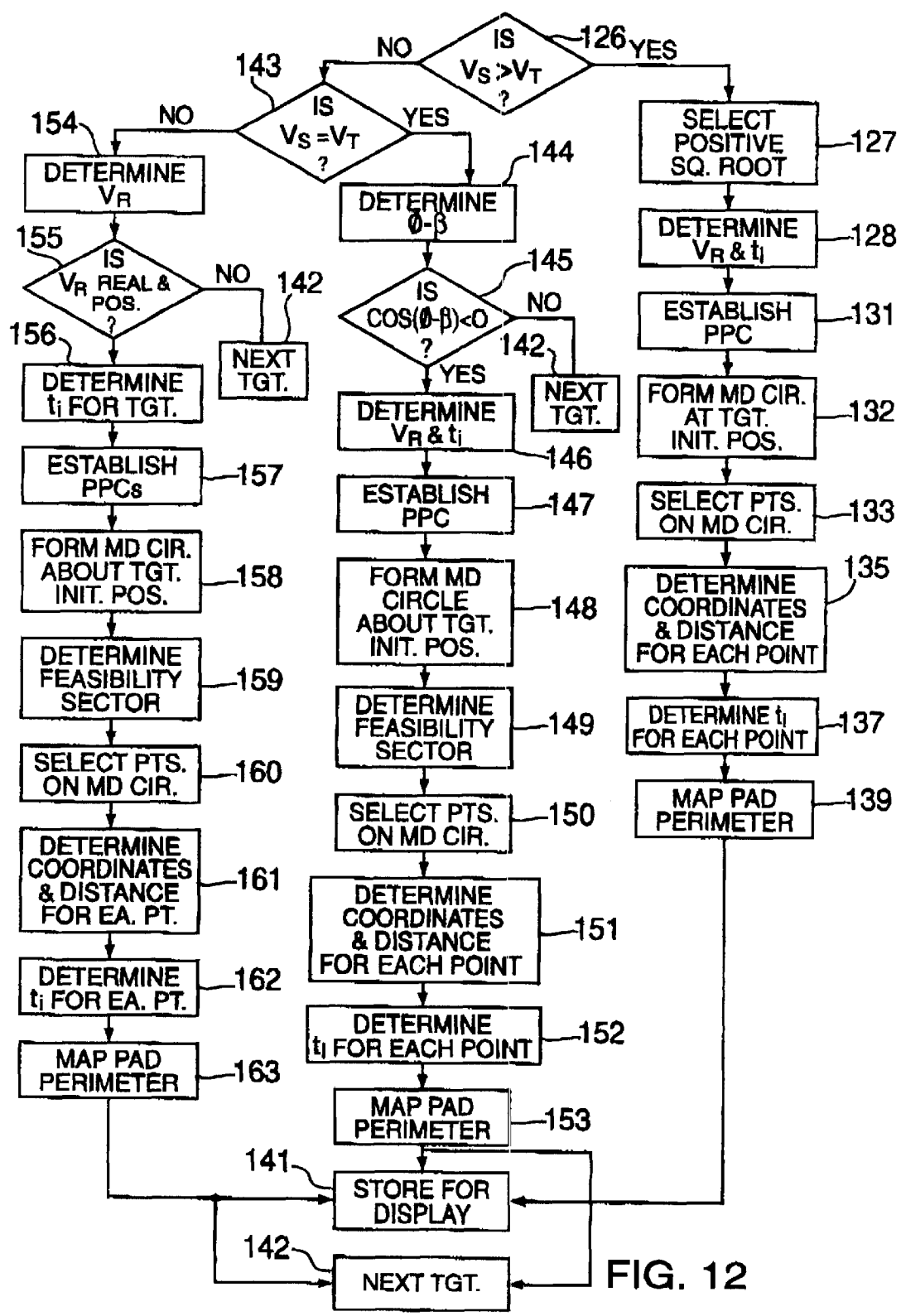
FIG. 12 is a flow chart of operations for the determination of a PAD.

A processor for providing PADs for these five situations is shown in FIG. 11. Signals representative of target position, speed, relative bearing and heading, own ship speed, and the desired minimum miss distance are provided to a computer 110 via a buffer 111. Computer 110 determines the relative velocity 113, time to intercept ($t_i$) 115 utilizing the target speed, own ship speed, and relative bearing and distance to the target, and the PPC employing target speed, target heading and time to intercept. Computer 110 establishes the PAD by forming the miss distance circle 123 about the target initial position 119, determining the feasibility sector for the region within the circle 121, and establishing own ship intercepts with selected points on the miss distance circle. Signals representative of the PAD are coupled to a memory 125 for subsequent PAD display. The operation of the computer 110 will be more fully understood with reference to flow chart of FIG. 12.

Processing of the data supplied by the buffer 111 commences with a comparison of $V_S$ and $V_T$. If $V_S$ is greater than $V_T$ processing is routed from the comparator 126 to a square root selector 127 which selects the positive square root for the determination 128 of relative velocity $\overline{V}_R$ and time to intercept $t_i$. Signals representative of the relative velocity and time to intercept are then coupled to establish the PPC 113 with the target. It should be recognized that the determination of the PPC, though desirable, is not necessary for the mapping of the PAD. When the PAD is mapped the collision point is contained therein.

In determining the PAD a miss distance circle, having a radius $R_M$ equal to the desired minimum miss distance, is created about the initial position of the target 132. With the circle formed, points on the circumference are selected 133, preferably with uniform arc spacing between points. The coordinates and distance from own ship for each point are determined 135. Thereafter, the time for own ship to intercept each point is determined 137 with the utilization of own ship speed $V_S$, target speed $V_T$, and the initial coordinates of the point. The perimeter of the PAD is then mapped 139 by multiplying the components ($V_{TX}$, $V_{TY}$) of the target velocity by the time to intercept for each point on the circumference of the miss distance circle to determine the coordinate distance traveled and adding these distances to the corresponding initial coordinates to provide the intercept positions ($x_i$, $y_i$). Smoothly connecting the intercept positions completes the PAD perimeter. Signals representative of the PAD perimeter are coupled to a memory 141 and stored for display. At this time the processor is informed to consider the next target 142.

Should the comparator 126 indicate that $V_S$ is not greater than $V_T$, a second comparator 143 determines if $V_S = V_T$. If this is true the angular difference $\phi - \beta$ is determined 144 and a third comparator 145 determines if the $\cos(\phi - \beta)$ is negative. Alternatively, the angle $\alpha = \theta - \psi + \pi$ could be determined and the third comparator 145 could determine if $\cos \alpha$ is positive. The determination of $\alpha$, however, requires more processing than does the determination of ($\phi - \beta$). Should $\cos(\phi - \beta)$ be positive or $\cos \alpha$ be negative, the processor is informed to consider the next target. If $\cos(\phi - \beta)$ is negative or $\cos \alpha$ be positive, the relative velocity and time to intercept the target is determined 146 and the PPC is established 147. The processing continues with the formation of the MDC about the initial position of the target 148 and the determination of the feasibility sector 149. After the feasibility sector has been determined, points are selected on the MDC 150 and the relative coordinates and distance from own ship for each selected point are determined 151. The time for own ship to intercept each point on the MDC is determined 152 and the PAD perimeter is established 153. After the PAD perimeter is determined the map data is coupled to the memory 141 for display and the processor is informed to consider the next target.

If the comparison 143 determines that $V_S$ is not equal to $V_T$, the processing is directed to determine $V_R$ 145 for $V_S < V_T$. This is the remaining condition since the other two possible conditions have been found not to be true. A decision is then made as to whether $V_R$ is real and positiv[0085] 154. If both of these conditions are not met, the computer is instructed to consider the next target 142. If both of these conditions are met, the times for own ship to intercept the target are determined 156 and the PPCs are established 157. The processing continues as previously described after the MDC is formed about the initial position of the target; the feasibility sector determined 159, the points are selected on the MDC 160, the coordinates and the distance from own ship for each point is determined 161, the time to intercept for each point is determined 162, and the mapping of the PAD is mapped 163. Since, in general, there are two intercepts when $V_S < V_T$, two intercept times for each selected point will generally be provided ($x_{TO}$, $y_{TO}$) 162 to the to the PAD mapper 163. These intercept times are associated to form two sets of times that are processed by the PAD mapper 163 to establish the two resulting PADs. The data for the two PADs is provided to the memory 141 and stored for display and the computer is informed to consider the next target 142.

Figure 13:
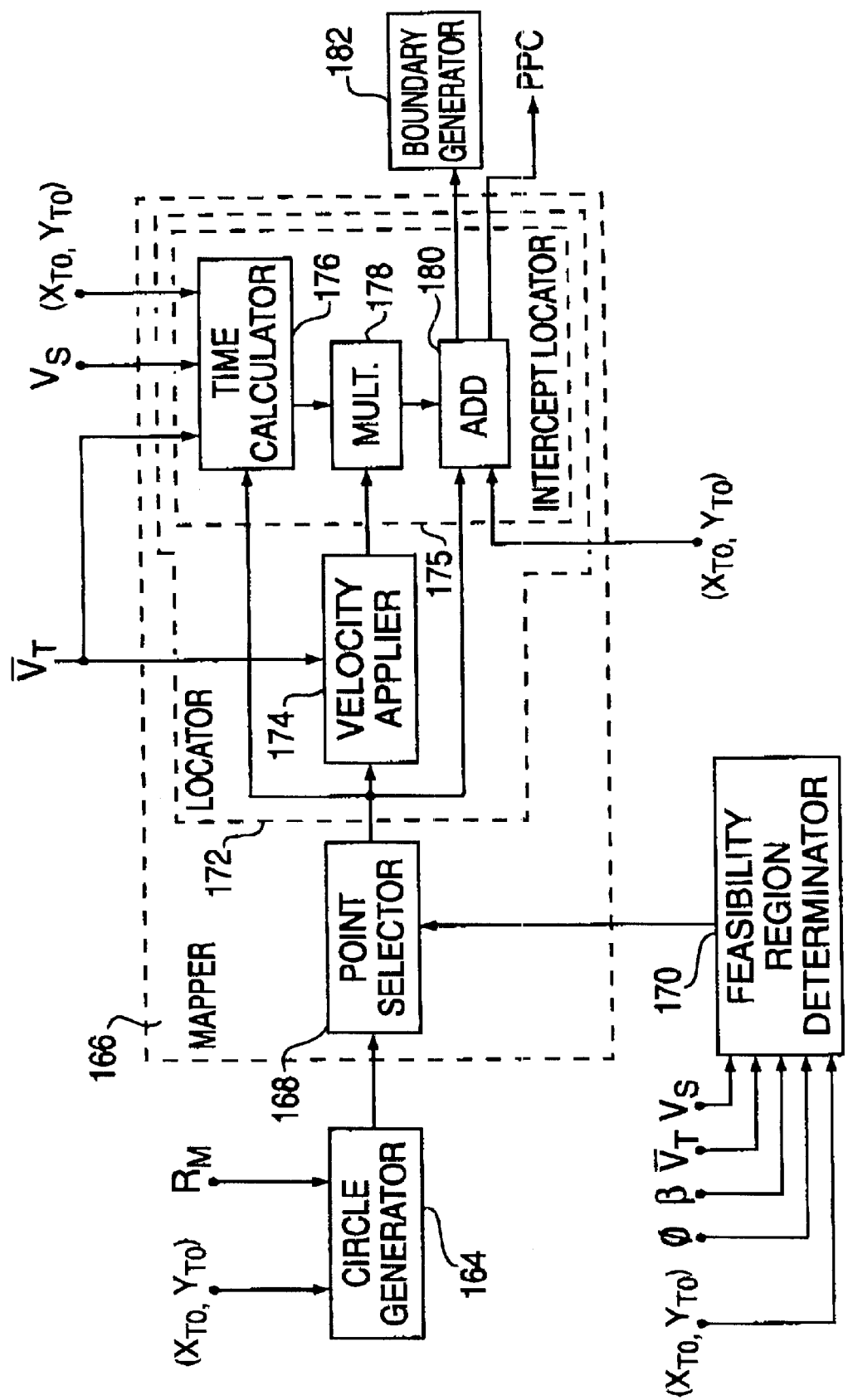
FIG. 13 is a block diagram of a preferred embodiment of the invention.

FIG. 13 is a block diagram of a possible instrumentation for practicing the invention. The coordinates ($x_{TO}$, $y_{TO}$) of the target relative to own ship and the desired miss distance $R_M$ may be coupled to circle generator 164 wherein a miss distance circle (MDC) centered at ($x_{TO}$, $y_{TO}$) having a radius $R_M$ is determined. Signals representative of the MDC are coupled to a mapper 166 to which signals representative of the target velocity, own ship velocity, and relative position of the target are also coupled. The mapper 166 processes these signals to provide the boundary of a PAD. The mapper 166 may comprise a point selector 168 which selects points on the MDC in accordance with signals received from the circle generator 164 and a feasibility region determinator 170. Signals representative of these selected points are coupled to a locator 172 which projects these points to possible intercept locations with own ship. The target velocity is applied to each selected point in a velocity applier 174 which is coupled to an intercept locator 175 for the determination of the possible intercepts of the selected points with own ship. Time to intercept own ship for each selected point is determined in a time calculator 176 in intercept locator 175. Distances traversed by each selected point are represented by multiplying the velocity representative signals from velocity applier 174 and the time to intercept representative signals from the time calculator 176 in a multiplier 178. Distance traveled representative signals are respectively added to the coordinate representative signals in an adder 180 from which the intercept locator 175 provides signals representative of the possible intercepts with own ship to a PAD boundary generator 182.

Velocity applier 174 also applies the target velocity to the initial coordinate representative signals of the target which are multiplied by signals representative of the time for own ship to intercept the target coupled from the time calculator 176. Signals representative of these multiplications are added to the initial coordinate signals to provide the PPC for the target.

Though the invention has been described with reference to ships, it should be recognized that it is not so limited and is applicable to all types of vehicles.

While only certain embodiments of the invention have been described, it will be apparent to those skilled in the art that various changes and modifications may be made within the purview of the appended claims without departing from the true scope and spirit of the invention in its broader aspects.

We claim:

1. A method for predicting an area of danger for a first vehicle in the vicinity of a second vehicle, the first vehicle having a velocity and the second vehicle having a velocity and initial relative position to said first vehicle comprising the steps of:

establishing a miss distance circle having a radius equal to a desired miss distance about an initial position of said second vehicle;

projecting said miss distance circle to establish a boundary for a predicted area of danger, which avoided assures that said first vehicle will pass said second vehicle no closer than said miss distance.

2. The method of claim 1 wherein said projecting step includes the steps of:
   selecting points on said miss distance circle, thereby providing selected points;
   projecting said selected points to locations of intercept with said first vehicle; and
   smoothly connecting said locations to establish said boundary.

3. The method of claim 2 wherein said projecting step includes the steps of:
   establishing coordinates of said selected points relative to said first vehicle, thereby providing selected points coordinates;
   imparting said second vehicle velocity to said selected points; and
   utilizing said second vehicle velocity imparted to said selected points, said first vehicle velocity, and said selected points coordinates to determine said intercept locations.

4. The method of claim 3 wherein said utilizing step includes the steps of:
   determining intercept time between said first vehicle and each selected point;
   multiplying components of said second vehicle velocity by said intercept time for each selected point to provide respective coordinate changes for each selected point due to distance traversed over said intercept time; and
   a adding said respective coordinate changes to corresponding coordinates of said selected points, thereby establishing said intercept locations.

5. The method of claim 4 wherein points selected in said selecting points step are equally spaced on said miss distance circle.

6. The method of claim 4 further including the steps of:
   analyzing said intercept time to determine boundaries of feasible region within said miss distance circle; and
   wherein said selecting points step selects points on said miss distance circle only within said feasible region.

7. The method of claim 6 wherein said selecting points step includes the steps of:
   determining the feasibility angular range subtended from said first vehicle by said feasibility region;
   dividing solid angular region into equal angle segments; and
   projecting edges of said angle segments to crossing points with said miss distance circle, said crossing points being said selected points.

8. The method of claim 6 wherein points selected in said selecting points step are equally spaced within said feasibility region on said miss distance circle.

9. The method of claim I further including the steps of:
   determining relative velocity of said second vehicle to said first vehicle;
   analyzing said relative velocity to determine boundaries of feasible region within said miss distance circle; and
   selecting points on said miss distance circle only within said feasible region.

10. The method of claim 9 wherein said selecting points step includes the steps of:
    determining feasibility angular range subtended from said first vehicle by said feasibility region;
    dividing said angular range into equal angle segments; and
    projecting edges of said angle segments to crossing points with said miss distance circle, said crossing points being said selected points.

11. The method of claim 9 wherein points selected in said selecting points step are equally spaced within said feasibility range on said miss distance circle.

12. An apparatus for predicting an area of danger for a first vehicle in the vicinity of a second vehicle, the first vehicle having a velocity and the second vehicle having a velocity and an initial relative position to the first vehicle comprising:
    a miss distance circle generator for providing signals representative of a desired miss distance circle about said initial relative position of said second vehicle; and
    a mapper coupled to receive said miss distance circle representative signals for providing signals representative of a boundary of a predicted area of danger, which avoided assures that said first vehicle will pass said second vehicle no closer than said miss distance.

13. An apparatus in accordance with claim 12 wherein said mapper includes:
    a point selector for selecting points on said miss distance circle and supplying signals representative of selected points;
    a locator coupled to said point selector and to receive signals representative of said first and second vehicle velocities for providing signals representative of locations of intercept between said first vehicle and said selected points; and
    a boundary generator coupled to receive said location representative signals for providing signals representative of a smooth boundary through said intercept locations.

14. The apparatus of claim 13 wherein said locator includes:
    a velocity applier coupled to receive signals representative of said second vehicle velocity for applying said second vehicle velocity representative signals to each of said selected points; and
    an intercept locator coupled to said coordinate determinator, said velocity applier, and to receive said first vehicle velocity representative signals for providing signals representative of said intercept locations.

15. The apparatus of claim 14 wherein said intercept locator includes:
    a time calculator coupled to said velocity applier, said point selector, and to receive said first vehicle velocity representative signals for determining intercept time between said first vehicle and each selected point and providing signals representative thereof;
    a multiplier coupled to said time calculator and said velocity applier for multiplying coordinates of said second vehicle velocity by said intercept time for each selected point to determine coordinate changes for each selected point due to distance traversed over said intercept time and provide signals representative thereof; and
    an adder coupled to said multiplier and said coordinate determinator to establish an intercept location with said first vehicle for each selected point and provide signals representative thereof.

16. The apparatus of claim 15 wherein points are positioned on said miss distance circle, by said point selector, with equal spacing therebetween.

17. The apparatus of claim 15 further including feasibility region analyzer coupled to said point selector and to receive said first and second vehicle velocities and said relative position of said second vehicle for determining feasible region boundaries on said miss distance circle and causing said point selector to select points on said miss distance circle only within said feasible region.

18. The apparatus of claim 17 wherein said point selector includes;
- a feasibility angular range determinator coupled to said feasibility region analyzer for determining angular range subtended from said first vehicle by said feasibility region;
- an angle divider coupled to said feasibility angular range determinator for dividing said angular range into equal angle segments; and
- an angle edge projector coupled to said angle divider for projecting edges of said angle segments to crossing points with said miss distance circle, said crossing points chosen as said selected points.

19. The apparatus of claim 18 wherein said point selector includes means for selecting points on said miss distance circle that are equally spaced.

20. The apparatus of claim 12 wherein said projector includes:
- a relative velocity determinator coupled to receive said signals representative of said first and second vehicle velocities for determining relative velocity of said second vehicle to said first vehicle;
- a relative velocity analyzer coupled to receive said signals representative of said relative velocity for determining boundaries of feasibility region within said miss distance circle and providing signals representative of said boundaries; and
- a point selector coupled to said relative velocity analyzer for selecting points on said miss distance circle within said feasible region and providing signals representative of said selected points.

* * * * *